United States Patent [19]

Cookingham

[11] Patent Number: 5,531,181
[45] Date of Patent: Jul. 2, 1996

[54] APPARATUS FOR ILLUMINATING INSTRUMENT CLUSTER POINTERS

[75] Inventor: Gerald T. Cookingham, Flushing, Mich.

[73] Assignee: Delco Electronics Corporation, Kokomo, Ind.

[21] Appl. No.: 218,406

[22] Filed: Mar. 28, 1994

[51] Int. Cl.$^6$ .................................................. G01D 13/22
[52] U.S. Cl. .......................... 116/288; 116/328; 362/26
[58] Field of Search .................................. 116/284, 286, 116/287, 288, 303, 305, 327, 328, 332; 362/23, 26, 27, 28, 29, 30, 31, 226; 439/620, 80–83, 56

[56] References Cited

U.S. PATENT DOCUMENTS

| | | | |
|---|---|---|---|
| 2,286,737 | 6/1942 | Hills | 362/26 |
| 3,603,779 | 9/1971 | Horpe | 362/23 |
| 4,044,708 | 8/1977 | Klein | 116/286 |
| 4,233,927 | 11/1980 | Oikawa et al. | 116/287 |
| 4,258,643 | 3/1981 | Ishikawa et al. | 362/26 |
| 4,431,966 | 2/1984 | Pucciarello | 116/286 |
| 4,646,206 | 2/1987 | Bauer et al. | 362/23 |
| 4,829,407 | 5/1989 | Bushell et al. | 362/29 |
| 5,084,698 | 1/1992 | Sell | 116/288 |
| 5,142,456 | 8/1992 | Murphy | 116/288 |

*Primary Examiner*—William A. Cuchlinski, Jr.
*Assistant Examiner*—Andrew Hirshfeld
*Attorney, Agent, or Firm*—Jimmy L. Funke

[57] ABSTRACT

A gauge mounted on one side of a face plate by mounting ears drives a light conducting pointer on the other side via a spindle extending through a hole in the plate, and has terminal pins coupled to a circuit board. An LED holder has a transverse bridge extending across the gauge and has mounting ears also secured to the face plate. The holder supports an LED in the hole adjacent the spindle for directly illuminating the pointer. The holder has legs which extend toward the circuit board and contain terminal pins coupled at one end to the board. LED leads are connected to the other end of the terminal pins. Alternatively, the terminal pins are omitted and rigid LED leads extend down the legs to directly couple to the circuit board. The pointer is illuminated with different colors in different ranges of movement by using LEDs of different colors of light emission and positioned to selectively light the pointer.

10 Claims, 2 Drawing Sheets

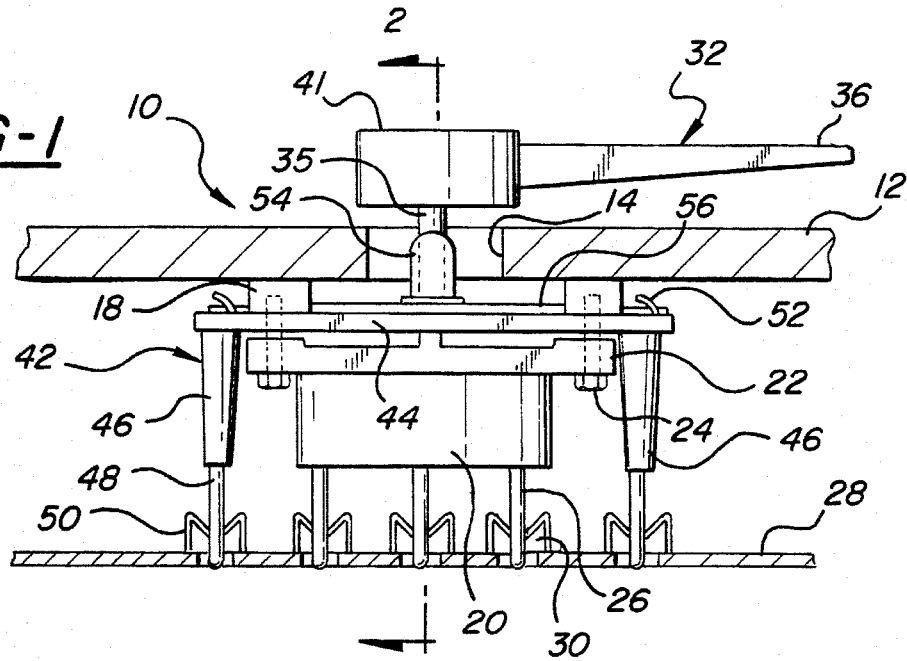
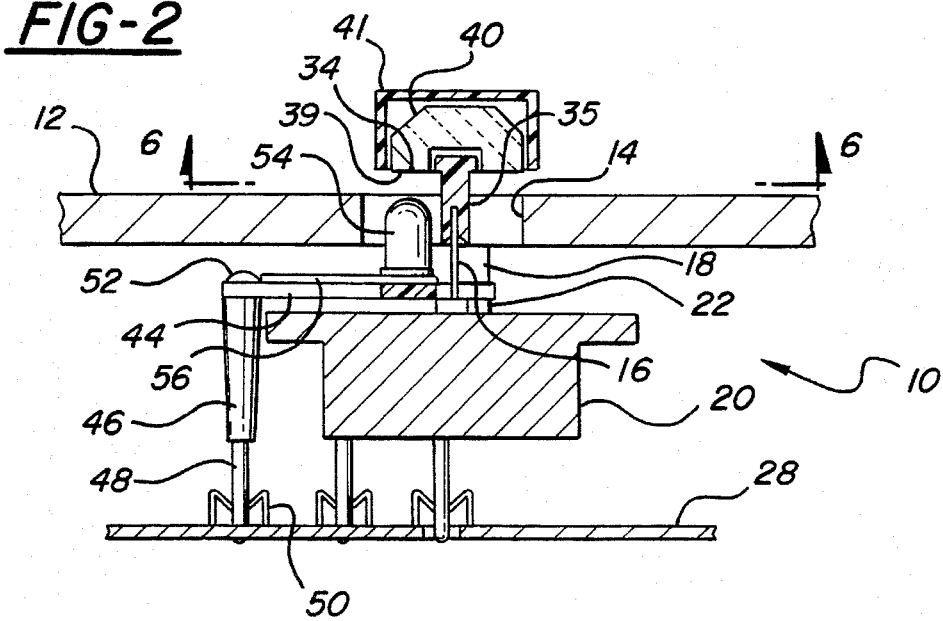
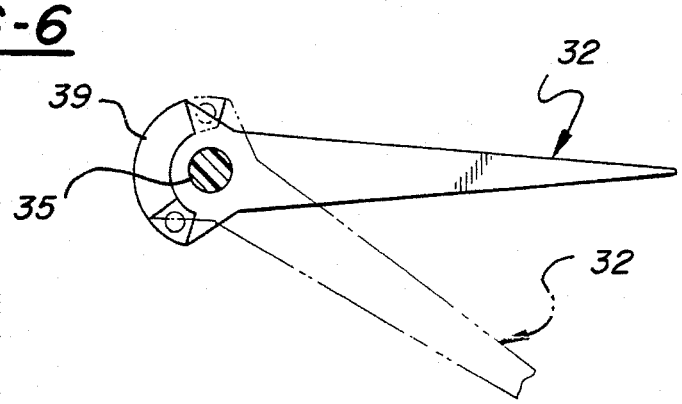

APPARATUS FOR ILLUMINATING INSTRUMENT CLUSTER POINTERS

FIELD OF THE INVENTION

This invention relates to lighted automotive instrument panels and particularly to apparatus for the illumination of instrument cluster pointers.

BACKGROUND OF THE INVENTION

It is a common practice in automotive vehicles to illuminate instrument clusters including illuminated gauge pointers. An instrument cluster includes a face plate bearing indicia for dials and other displays, and gauges behind the face plate which drive pointers across the dials. Generally the face plate is fashioned to serve as a light pipe to direct light from a number of strategically placed lamps to the pointers. The pointers comprise light pipes to carry the light along their length for clear viewing. The face plate itself may comprise a polycarbonate substrate for such light conduction. Each type of cluster requires custom design to achieve proper illumination of each portion of the display. The constraint of providing light to the pointers via the light pipe arrangement makes the design difficult and limits the choice of materials, and the displays are sometimes expensive to manufacture.

In addition to simplifying the illumination of pointers, it is also desirable to enhance the pointer illumination to exhibit different colors in different ranges so that, for example, a warning is given for a certain pointer range.

SUMMARY OF THE INVENTION

It is therefore an object of the invention to simplify the illumination of instrument clusters and particularly pointers. Another object is to facilitate instrument cluster design by improving the manner of lighting pointers. An additional object is to control the color of pointer illumination in accordance with pointer position.

The invention is carried out by an LED holder assembled to a gauge for holding an LED adjacent the gauge spindle and the pointer for directly illuminating the pointer. The holder is of universal application, fitting standard gauges and independent of other cluster structure or illumination concerns. This allows the face plate or other cluster structure to be designed without concern for pointer illumination.

The LED holder comprises a polymer molding having a transverse strip of material sandwiched between a gauge and the face plate and held in place by the same fasteners which secure the gauge to the face plate. Legs on either end of the strip extend alongside the gauge and terminal pins embedded in the legs extend from the strip to a circuit board which supplies power for the gauge as well as the pointer LED. The LED is mounted on the strip adjacent the gauge spindle and in direct view of the pointer hub. Lead wires of the LED are joined to the terminal pins and hold the LED in place. An alternate design omits the terminal pins, but the LED has solid leads which lie along the strip and extend down the legs where they protrude to the circuit board. Either design may incorporate more than one LED arcuately spaced around the spindle axis. By using LEDs of different colors and spacing the LEDs such that only one color at a time enters the hub, except for an overlap region, the pointer will change colors as it moves from one range to another.

BRIEF DESCRIPTION OF THE DRAWINGS

The above and other advantages of the invention will become more apparent from the following description taken in conjunction with the accompanying drawings wherein like references refer to like parts and wherein:

FIG. 1 is a cross-sectional view of an instrument cluster having a gauge and pointer illumination apparatus according to the invention;

FIG. 2 is a cross section of the assembly of FIG. 1 taken along line 2—2;

FIG. 6 is a cross section of the pointer taken along line 6—6 of FIG. 2, according to the invention.

DESCRIPTION OF THE INVENTION

Figure 3:
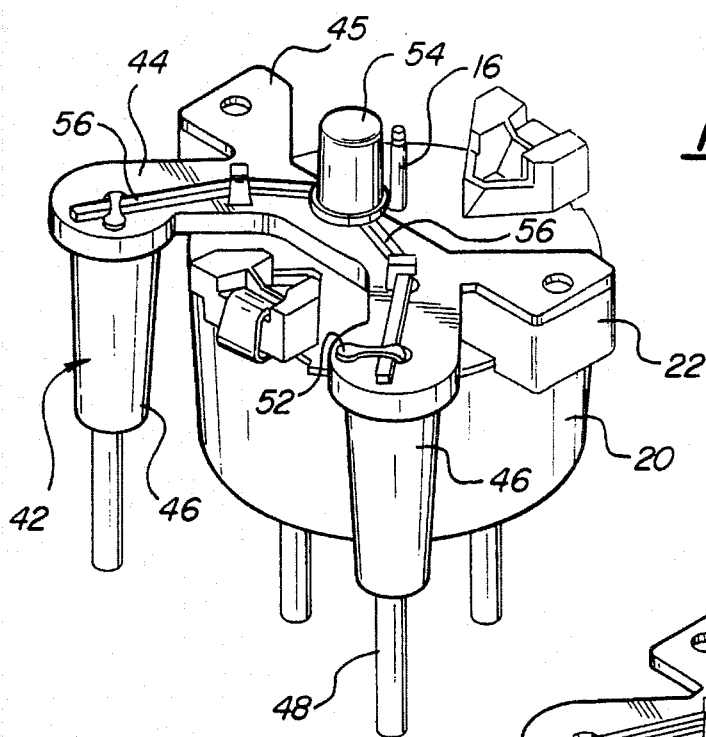
FIG. 3 is an isometric view of the gauge and illumination apparatus of FIG. 1.

Referring to the drawings, a portion of an instrument cluster 10 includes a face plate 12 with an aperture 14 for a gauge spindle 16 and mounting bosses 18 on the rear of the plate. An air core gauge 20 has ears 22 aligned with the bosses 18 and are secured by fasteners 24 to the bosses. The gauge 20 has a plurality of terminal pins 26 extending to a circuit board 28 which carries box clips 30 for coupling with the pins. The circuit board may be either a hardboard printed circuit or a flexible printed circuit supported on a rigid substrate. The spindle 16 of the gauge extends through the aperture 14 and carries a translucent pointer 32 which comprises a hub 34, a tubular socket 35 engaging the spindle 16, and a needle preferably comprising a tapered clear light pipe 36 coated on its rear face 38 to forwardly reflect light conducted from the hub. Light entering a rear light entry surface 39 of the hub is reflected from an angled front surface 40 into the light pipe 36. A decorative opaque cover 41 over the hub 34 masks light which escapes in the forward direction. As thus far described, the cluster, gauge and pointer arrangement are already known in the prior art and need no further description. The manner of providing illumination to the pointer, however is an improvement over the prior art schemes.

A holder or bridge 42 molded of a polymer includes a transverse strip 44 which extends between the gauge 20 and the face plate 12 beside the spindle 16, and a pair of ears 45 which register with the ears 22 of the gauge and which are sandwiched between the gauge and the mounting bosses 18 to support the bridge. The bridge also has a pair of legs 46 on opposite sides of the gauge 20 normal to the strip and projecting toward the circuit board. The legs 46 are hollow to receive terminal pins 48 which are the same as the gauge terminal pins 26 and which couple to box clips 50 in the circuit board. The ends of the pins 48 adjacent the strip 44 terminate in flat tabs 52. An LED 54 mounted on the strip 44 in the aperture 14 adjacent the spindle 16 has leads 56 which extend along the strip to the terminal pins 48 for solder connection to the tabs 52. As best shown in FIG. 3, retainer fingers 58 on the face of the strip 44 assist in holding the leads 56 in place. The leads provide the main support of the LED.

Figure 4:
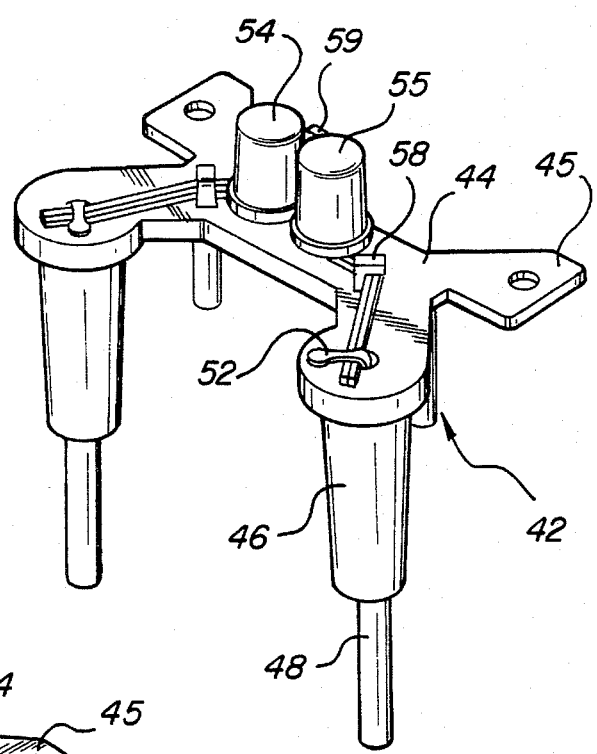
FIG. 4 is an isometric view of an LED holder which is a variant of that of FIG. 1.
Figure 5:
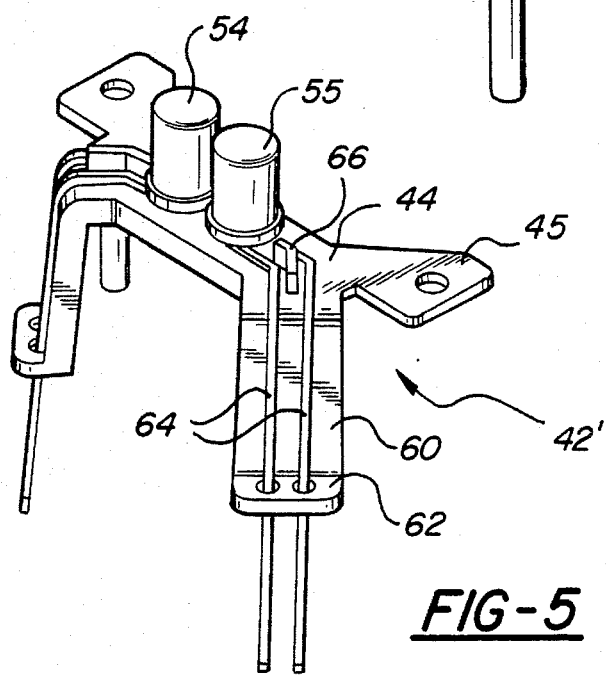
FIG. 5 is an isometric view of another embodiment of LED holder according to the invention.

Two LEDs 54 and 55 connected in parallel may be used instead of one, as shown in FIG. 4. There, the LED holder 42 is shown separately from the gauge. A single locator tab 59 is positioned behind the LEDs to assist in correctly positioning the LEDs. FIG. 5 reveals another embodiment of LED holder 42'. Instead of the legs 46 containing terminal pins, the holder 42' has flat legs 60 with an apertured foot portion 62, and the LEDs are equipped with rigid solid or one piece leads 64, each preformed with an angle to conform to the shape of the holder. The leads extend through the foot apertures and directly connect to the circuit board. In this example, using two LEDs 54 and 55, two leads 64 run down each leg 60 and a separator wall 66 on the strip 44 keeps the leads apart.

In the configurations where more than one LED is used to illuminate the pointer 32, it is advantageous to use different colored LEDs 54 and 55 spaced so that in one pointer position range the pointer 32 is illuminated with light of one color and in another range it is illuminated with another color. A slight overlap of the ranges effects a small region where the two colors blend. In this manner special information, such as a warning, relative to a pointer range is afforded easily and at low cost. FIG. 6 shows the rear surface of the pointer 32 with much of the cover 41 omitted for simplicity. The rear light entry surface 39 is an annular segment which moves in a path adjacent the LEDs upon pointer rotation, and which receives light from an LED 54 throughout a range depending on the arcuate extent of the surface 39. When the pointer 32 moves outside the range of illumination of the LED 54, as shown in dotted lines, the light entry surface 39 overlies the second LED 55 so that the pointer is illuminated by the LED 55. Thus the two LEDs are arcuately spaced to define a range for illumination by each LED alone. Preferably there will be a small interface region where the light entry surface 39 overlies both LEDs and the two colors blend.

Light sources or lamps other than LEDs may be used. LEDs are preferred, however, since they are small, very reliable and tend to direct the light forward onto the pointer, whereas other lamps tend to cast much of their light laterally.

It will thus be seen that the LED holder affords an inexpensive apparatus for optimally positioning a light source adjacent a pointer. The holder uses standard terminal pins, standard LEDs, and a simple molded bridge. It is secured in place using existing fasteners used for the gauge.

The embodiments of the invention in which an exclusive property or privilege is claimed are defined as follows:

1. In an instrument cluster having a circuit board, a gauge electrically connected to the circuit board and having a spindle carrying a translucent illuminated pointer for rotation about a pointer axis, and means for mounting the gauge between the circuit board and the pointer; apparatus for illuminating the pointer comprising:

a bridge adjacent the spindle and supported on the gauge between the gauge and the pointer;

a light source supported on the bridge adjacent the spindle and offset from the pointer axis for illuminating the pointer; and electrical leads on the bridge extending from the light source and around the gauge to the circuit board.

2. The apparatus defined in claim 1 wherein:

the bridge has a pair of legs on either side of the gauge extending past the gauge to the circuit board, the bridge further having a transverse member extending between the legs and attached to the gauge adjacent the pointer.

3. The apparatus defined in claim 2 wherein the light source is at least one LED, and the electrical leads comprise:

LED leads extending along the transverse member, and terminal pins coupled to the LED leads and incorporated within the legs of the bridge and extending from the legs to the circuit board.

4. The apparatus defined in claim 2 wherein the light source is at least one LED; and the electrical leads each comprise a one-piece LED lead extending along the transverse member and down the legs to the circuit board.

5. The apparatus defined in claim 1 wherein:

the bridge has a pair of legs on either side of the gauge extending to the circuit board, the bridge further having a transverse member mounted on the gauge and extending between the legs and across the gauge adjacent the pointer; and the electrical leads comprise terminal pins secured in the legs and the pins protrude from the legs for connection to the circuit board.

6. The apparatus defined in claim 1 wherein the light source is at least one LED.

7. The apparatus as defined in claim 1 wherein the light source comprises a plurality of spaced LEDs; and the pointer includes a hub mounted to the spindle and having a light entry surface movable in an arcuate path adjacent the LEDs and of sufficient extent to receive light from at least one of the LEDs for any given pointer position.

8. The apparatus as defined in claim 7 wherein each LED emits a light of a different color so that the illumination color of the pointer depends on pointer position.

9. The apparatus defined in claim 1 wherein:

the bridge has a pair of legs on either side of the gauge extending to the circuit board, the bridge further having a transverse member extending between the legs and across the gauge adjacent the pointer;

the apparatus further comprising lead retainers on the transverse member and the legs; wherein the electrical leads extend along the transverse member and along the legs for connection to the circuit board, the electrical leads being secured by the retainers.

10. The apparatus defined in claim 1 wherein the instrument cluster includes a face plate between the gauge and the pointer for supporting the gauge and wherein:

the gauge includes mounting ears; and the bridge includes mounting ears in registry with the gauge mounting ears and sandwiched between the gauge mounting ears and the face plate the mounting ears of the bridge being attached to both the face plate and the mounting ears of the gauge.

* * * * *